Figures 1, 2:
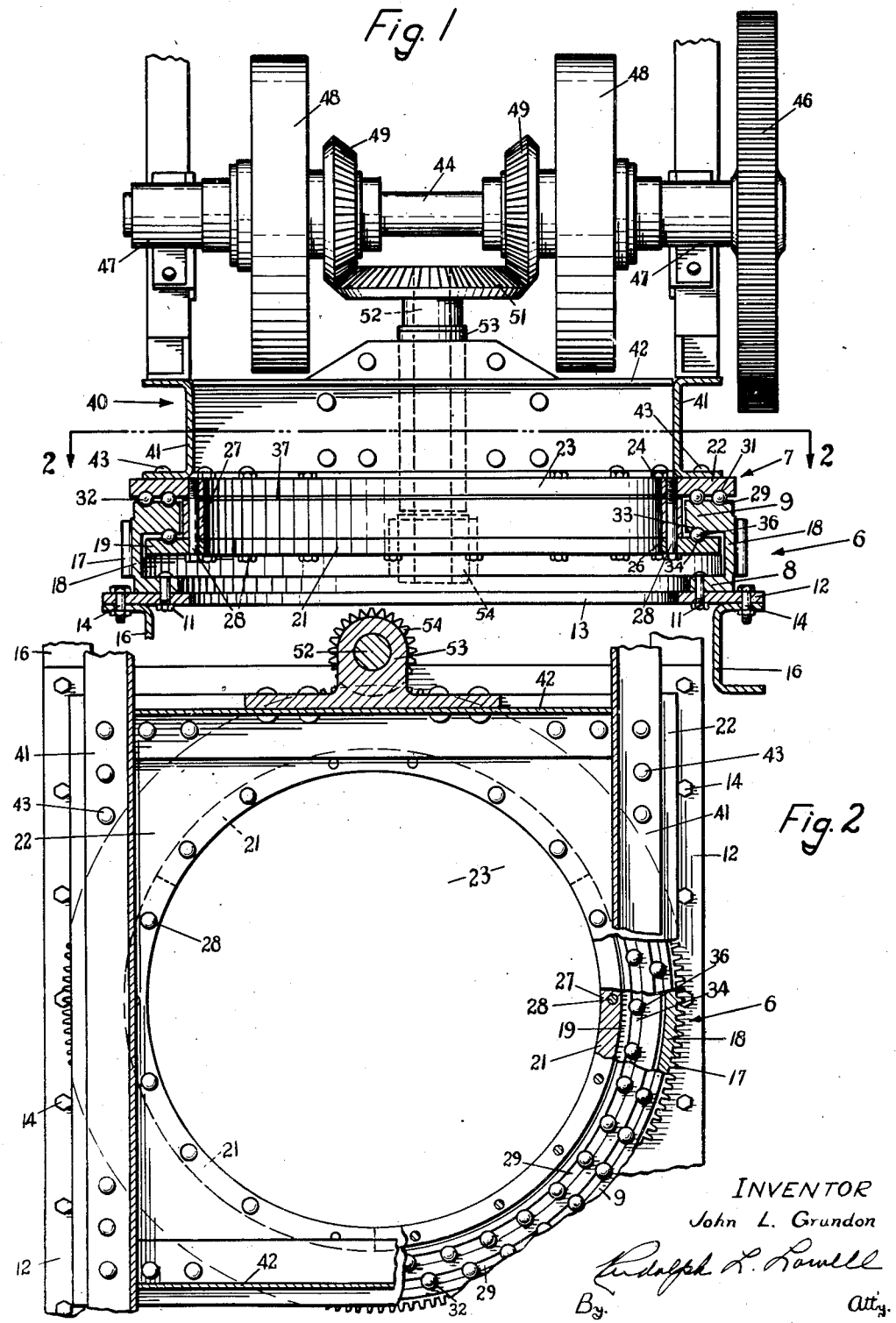

Sept. 6, 1949.     J. L. GRUNDON     2,481,416
TURNTABLE UNIT FOR PORTABLE MECHANICAL CRANES
Filed Nov. 26, 1947

INVENTOR
John L. Grundon

Patented Sept. 6, 1949

2,481,416

UNITED STATES PATENT OFFICE 2,481,416

TURNTABLE UNIT FOR PORTABLE MECHANICAL CRANES

John L. Grundon, Des Moines, Iowa

Application November 26, 1947, Serial No. 788,257

4 Claims. (Cl. 212—68)

This invention relates generally to turntable units and in particular to a turntable unit for a portable mechanical crane.

An object of this invention is to provide an improved turntable unit for supporting the rotatable frame of a mechanical crane or shovel.

A further object of this invention is to provide a turntable unit for supporting a rotatable frame on the main frame of a portable crane, such that the rotatable frame is easily and quickly manipulated and maintained at all times against lateral tipping movement relative to the main frame.

Another object of this invention is to provide a turntable unit which is of a preassembled construction, adapted for heavy duty use, and capable of being operated efficiently over prolonged periods of use with a minimum of servicing and maintenance attention.

A feature of this invention is found in the provision of a turntable unit for a crane in which a stationary externally toothed ring gear is formed with a pair of vertically spaced inwardly extended annular flanges or projections. A rotatable structure of a substantially U-shape in transverse cross section, has its legs arranged in a straddling relation with the upper flange on the ring gear. The lower ring gear flange is supported on the main frame of the crane, and the crane's rotatable frame is mounted on the top leg of the rotatable unit. Ball bearings are disposed for running in raceways formed in the opposite sides of the upper flange and in the inner adjacent sides of the legs of the rotatable structure, with the base of the rotatable structure, connecting the legs thereof, constituting a spacer member to maintain a desired operating tolerance for the ball bearings. A reversible power driven gear unit on the rotatable frame is in continuous meshed engagement with the stationary ring gear to provide for a reversed rotation of the rotatable frame about the ring gear.

Further objects, features and advantages of this invention will appear from the following description when taken in connection with the accompanying drawings, in which:

Fig. 1 is a vertical transverse sectional view of the turntable unit of this invention shown in assembly relation with a main frame and a rotatable frame of a portable mechanical crane; and Fig. 2 is a sectional view taken along the line 2—2 in Fig. 1, with certain parts being broken away to more clearly show the construction of the turntable unit.

With reference to the drawings, the turntable unit of this invention is shown in Figs. 1 and 2 as including a stationary ring gear 6 and a rotatable ring structure or unit 7. The ring gear 6 is of a substantially U-shape in transverse cross section and has its legs or lateral annular projections 8 and 9 extended inwardly in a vertically spaced relation. The lower projection is connected by bolts 11 with a square base plate 12 having a central opening 13. The base plate in turn is connected by bolts 14 with a pair of longitudinal frame members 16 forming part of the main frame of a portable crane or the like. Gear teeth 17 are provided on the outer periphery of the base or connecting section 18 between the annular projections 8 and 9.

The rotatable structure 7 includes a lower flat annular ring member 19 formed of a series of arcuate sections 21, illustrated in the drawings as being three in number, arranged in an end to end relation. An upper plate member 22, of a substantially square shape, is formed with a central opening 23 of a diameter corresponding in size to the inner diameter of the ring member 19. The diameter of the opening 23 and the inner diameter of the ring member 19 are less than the diameter of the opening defined by the inner peripheral surface of the upper projection 9, so that when the plate member 22 and the ring member 19 are arranged to opposite sides of the projection 9, their inner ends or peripheral portions 24 and 26, respectively, extend inwardly of the projection 9. A spacer ring 27 is connected between the inner ends 24 and 26 of the members 22 and 19, respectively, by bolts 28.

With the members 19 and 22 and spacer ring 27 in their relative assembly positions, the ring structure 7 is of a substantially U-shape in transverse cross section, with the members 19 and 22 forming the legs, and the spacer ring the base or leg connecting section thereof, and is arranged relative to the ring gear 6 such that its legs are in a straddling relation with the upper projection 9.

A pair of raceways 29 are formed in the top surface of the upper projection 9, and a corresponding pair of raceways 31 are formed in the lower surface of the plate member 22 to receive ball bearings 32. In like manner a single raceway 33 is formed in the bottom surface of the projection 9 and a corresponding raceway 34 is formed in the top surface of the ring member 19 to receive ball bearings 36. A proper operating tolerance for the ball bearings 32 and 36 is provided by the spacer ring 27. If necessary shims or the like, indicated at 37, may be positioned between the spacer ring 27 and one of the members 19 and 22 to obtain a desired ball bearing tolerance.

In the assembly of the turntable unit, the base plate 12 is initially connected with the ring gear 6 by the bolts 11. The ball bearings 32 are then positioned in the raceways 29 of the upper projection 9 and the plate 22, with the spacer ring 27 loosely hung therefrom, is placed in position on the ball bearings 32. The sections 21 of the ring member 19 are then inserted through either of the openings 13 or 23 in the members 12 and 22, respectively, for assembly with the bearings 36 at the lower side of the projection 9. The turntable unit, as a complete package, is then mounted on the frame members 16 and secured thereto by the bolts 14.

A rotatable frame, indicated generally as 40, has a pair of longitudinal frame members 41 and a pair of transverse frame members 42 arranged in a substantially square shape corresponding in size to the plate member 22. The frame members 41 and 42 are mounted on the plate member 22 and are secured by bolts 43 to the corner portions of the plate 22.

The rotatable structure 7, and in turn the frame 40, are rotatable in reverse directions about the ring gear 6 by the provision of means including a horizontal power shaft 44 having a drive gear 46 at one of its ends adapted to be driven from a suitable power unit (not shown) carried on the frame 40. The shaft 44 is supported in bearings 47 which are mounted on the longitudinal frame members 41. Arranged in a spaced relation on the power shaft 44, and between the bearings 47, are a pair of clutch units shown generally at 48.

Between the clutch units 48, and in a spaced relation on the shaft 44, are a pair of bevel gears 49 which are in continuous meshed engagement with a common bevel gear 51 carried at the upper end of an upright shaft 52 supported in a bearing 53 mounted on the rear one of the transverse frame members 42. A pinion gear 54 at the lower end of the upright shaft 52 is in continuous meshed engagement with the teeth 17 on the ring gear 6.

The clutch units 48 are operatively associated with an adjacent bevel gear 49 to provide for the driven connection of a bevel gear 49 with a power shaft 44. Actuation of the clutch units 48 is accomplished manually by any suitable means (not shown). Thus by driving one or the other of the bevel gears 49 the bevel gear 51 is driven in reverse directions to in turn provide for a reversed travel of the pinion gear 54 about the ring gear 6.

The provision of the double row of bearings 32 between the plate member 22 and the projection 9 provides for a stable support of the rotatable frame 40 on the ring gear at all moved positions of the frame 40. Also, the single row of ball bearings 36 between the projection 9 and the ring member 19, retains the plate member 22 against lateral tipping movement relative to the ring structure 6. As a result the frame 40 is easily rotated and is positively held against tipping movement relative to the main frame of the crane.

From a consideration of the above description, it is seen that the invention provides a turntable unit for a mechanical crane which is of a rugged construction, adapted for heavy duty work, and comprised of a relatively few number of parts which are easily accessible for maintenance and servicing purposes. Further, the turntable unit is of a preassembled construction so that it can be handled as a single package in its assembly with and removal from the crane.

Although the invention has been described and illustrated with respect to a preferred embodiment thereof, it is to be understood that it is not to be so limited since changes can be made therein which are within the full intended scope of this invention as defined by the appended claims.

I claim:

1. A turntable unit comprising a stationary ring gear having an inwardly extended annular projection adjacent its upper side, with said projection having raceways formed in the opposite sides thereof, a pair of flat rotatable bearing supported members with central openings therein arranged at opposite sides of said projection such that their inner ends are extended inwardly of said projection, with the lower side of the top one of said rotatable members and the upper side of the bottom one of said rotatable members having raceways formed therein, ball bearings disposed between said rotatable members and said projection and within the raceways formed therein, a spacer ring arranged between the inner ends of said rotatable members, and means for clamping said inner ends against said spacer ring.

2. A turntable unit including a stationary ring gear of a substantially U-shape in transverse cross section arranged with the legs thereof extended inwardly, with the opposite sides of the upper leg being formed with raceways, a rotatable ring structure of a substantially U-shape in transverse cross section having its legs extended outwardly and arranged in a straddling relation with said upper leg, with the inner adjacent sides of the legs of said rotatable structure having raceways therein, and ball bearings disposed within said raceways.

3. A turntable unit comprising a horizontally arranged stationary ring unit, a pair of vertically spaced inwardly extended annular projections on said ring unit, a rotatable ring structure including a pair of vertically spaced members arranged at opposite sides of the upper one of said projections, with the bottom one of said spaced members being formed of a plurality of mating arcuate sections, and the inner ends of said spaced members being positioned inwardly from the inner end of said upper projection, an annular spacer member disposed between the inner ends of said spaced members, means for clamping said spaced members against said spacer member, with said spaced members and upper projection being formed with associated raceways, and ball bearings arranged between said upper projection and said spaced members and positioned within said raceways.

4. In a portable crane having a main frame and a rotatable frame, a turntable unit comprising an externally toothed stationary ring gear formed with a pair of vertically spaced inwardly projected annular flanges, with the bottom one of said flanges being adapted for support on said main frame, a rotatable structure of a substantially U-shape in transverse cross section having the legs thereof arranged in a straddling relation with the upper one of said annular flanges, a portion on said rotatable frame adapted to be supported on the top one of said legs, with the opposite sides of said upper flange and the corresponding adjacent sides of said legs being formed with associated raceways, ball bearings disposed within said raceways, and a reversible power driven gear unit on said rotatable frame having a gear member arranged in continuous meshed engagement with said ring gear.

JOHN L. GRUNDON.

No references cited.